Figure 1:
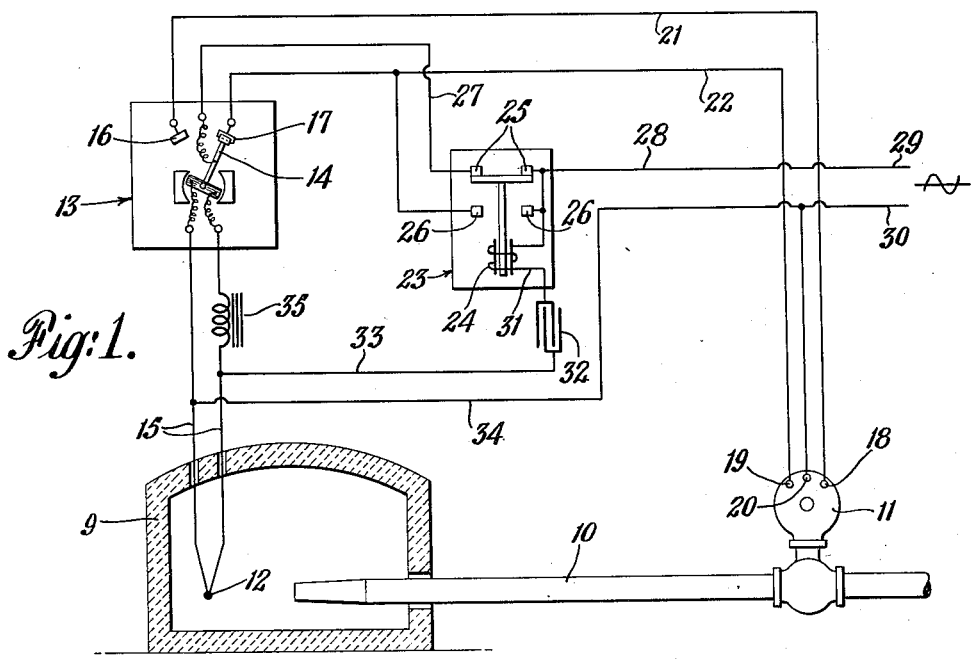

Feb. 1, 1944.   F. B. MacLAREN, JR   2,340,605
PROTECTIVE DEVICE
Filed March 8, 1941   2 Sheets-Sheet 1

INVENTOR
FRED B. MACLAREN, JR.
BY
E. C. Sanborn
ATTORNEY

Feb. 1, 1944.    F. B. MacLAREN, JR    2,340,605
PROTECTIVE DEVICE
Filed March 8, 1941    2 Sheets-Sheet 2

INVENTOR
FRED B. MacLAREN, JR.
BY
E. C. Sanborn
ATTORNEY

Patented Feb. 1, 1944

2,340,605

UNITED STATES PATENT OFFICE 2,340,605

PROTECTIVE DEVICE

Fred B. MacLaren, Jr., Waterbury, Conn., assignor to The Bristol Company, Waterbury, Conn., a corporation of Connecticut Application March 8, 1941, Serial No. 382,465

4 Claims. (Cl. 236—69)

This invention relates to protective devices for measuring and control systems, and more especially to means for preventing abnormal performance of such a system in the event of failure of an element thereof. The invention is illustrated in conjunction with pyrometric measuring and control systems, though its utility is manifestly not restricted to pyrometry.

In the measurement of temperatures through the agency of an instrument having a thermocouple for its measuring element, it is a well-known fact that the thermocouple, because of the high temperatures and destructive atmospheres to which it may be exposed, is the weak point in the system; and unduly increased resistance or an open circuit may occur through corrosion or other deterioration of the thermocouple elements at almost any time. The electromotive force set up by a thermocouple connected in the conventional manner tends to increase with a rise of the temperature to be measured and/or controlled. Conversely, a lowering of the thermo-electromotive force applied to the terminals of the measuring or controlling instrument in general reflects a lowering of the temperature and a demand for an increased supply of heating agent. Automatic pyrometer controllers are normally responsive to these conditions and serve to regulate valves or other devices through which the heating agent is admitted to the space to be heated in response to the changes in electromotive force developed by the thermocouple. In the event of an interruption to the thermocouple circuit, or undue increase in resistance, a controller connected in the normal manner will be unable to discriminate between this condition and a decrease of potential due to lowering of temperature, and will accordingly tend to increase the supply of heating agent to the space whose temperature is under control. This performance on the part of an automatic controlling instrument may be productive of undesirable or even hazardous results.

It is an object of this invention to provide in conjunction with a pyrometer system of the class under consideration means adapted to discriminate between normal operating conditions in the pyrometer wiring and abnormal circuit conditions due to thermocouple failure.

It is a further object to provide protective means which in the event of thermocouple failure will act to reduce or shut off supply of heating agent. It is a further object to provide signaling means to indicate a failure in the thermocouple circuit of a pyrometer system.

It is a further object to provide a protective device of the class described in which the protective function shall be exercised independently of any elements of the control instrument.

It is a further object to provide a protective device of the class described in which failure of the protective device itself or of any of the elements of which it is composed will cause the system to revert to a safe condition.

Other features and advantages of the invention will be hereinafter described and claimed.

In the drawings:

Fig. 1 is a diagrammatic representation of a pyrometric control system embodying the invention in its elementary form.

Figure 2:
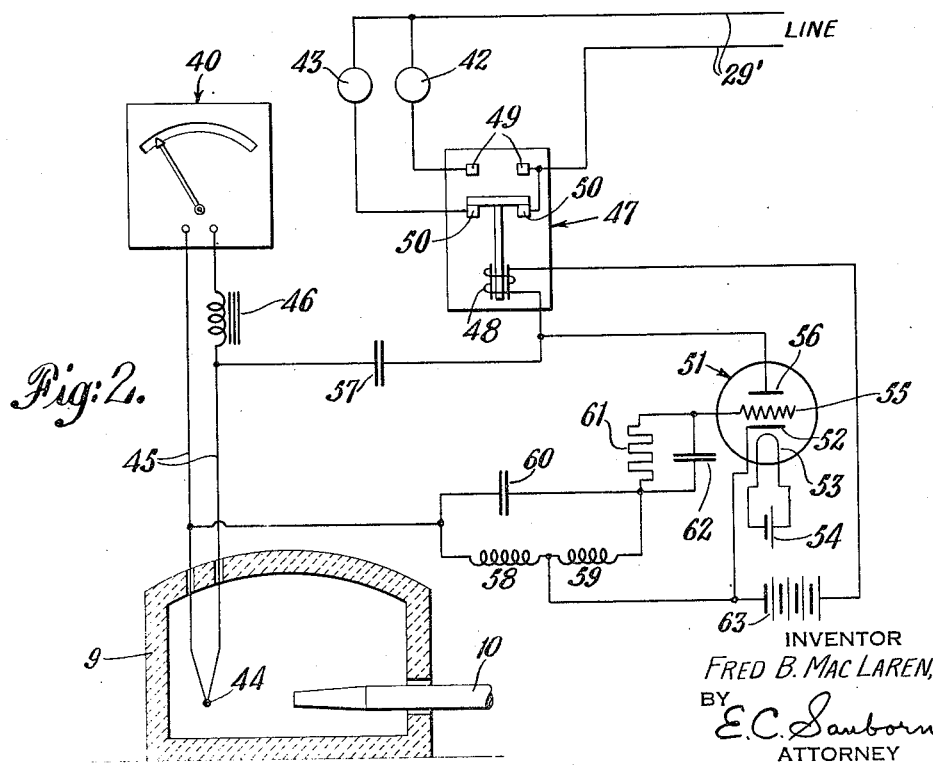
Figure 3:
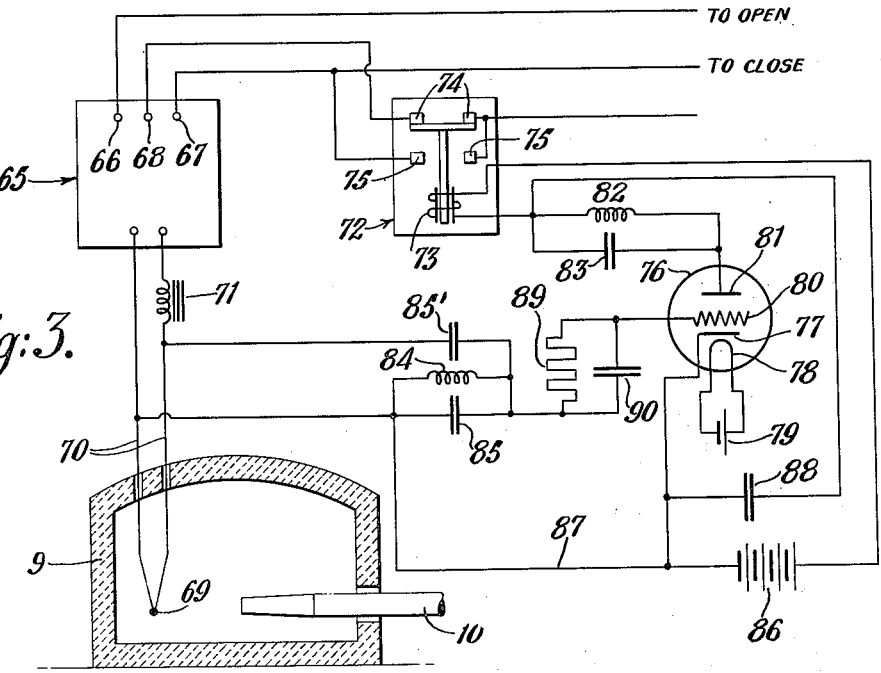
Figure 4:
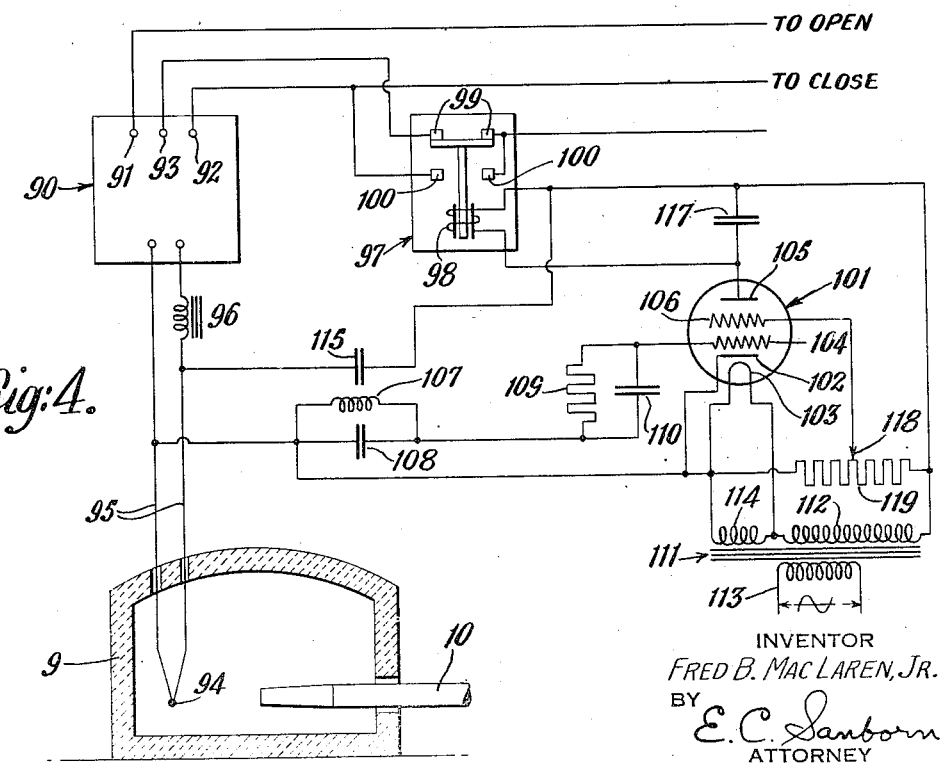

Figs. 2, 3, and 4 show, diagrammatically, different modifications of the invention, all suited to use with pyrometric measuring or control instruments.

Referring now to the drawings: In Fig. 1, numeral 9 designates an oven or furnace adapted to be heated by the admission of a heating agent through a pipe 10 under control of an electrically operated valve 11, and in which it is desired to maintain the temperature as measured by a thermocouple 12 at a regulated value as pre-established by the setting of a control instrument 13. The instrument 13 may be of the class fully described and set forth in U. S. Letters Patent 1,979,330, granted to applicant's assignee, November 6, 1934. This instrument includes a measuring element 14 adapted to be deflected in response to the electromotive force developed in the couple 12 to which it is connected by a two-conductor circuit 15, and to engage either one of two contacts 16 and 17 respectively, according to whether the temperature at the couple 12 is lower or higher than the pre-established setting. The instrument 13, instead of being of the "direct-deflecting" type, as in the aforesaid Patent 1,979,330, may be of the null or potentiometric type, as, for example, that fully set forth and disclosed in U. S. Letters Patent 1,474,884, issued to the assignee of L. H. Behr, November 20, 1923. Or the instrument may be of the combined recording and controlling class, as set forth in U. S. Letters Patent 1,356,804, issued to the assignee of H. Brewer, October 16, 1920. In both these instruments, actual measurement is effected by reducing to a zero value the current flowing through the thermocouple circuit.

The electrically operated valve 11 is provided with terminals 18, 19, and 20, these being so connected that upon the application of electrical power to the terminals 18 and 20 the mechanism will be operated in a sense to open the valve, and upon the application of power to the terminals 19 and 20 the mechanism will be operated in a sense to close the valve. The terminals 16 and 17 on the control instrument 13 are connected respectively to terminals 18 and 19 on the valve 11 by means of conductors 21 and 22. A relay 23 having an actuating winding 24 is provided with contacts 25 adapted to be closed when said winding is energized and contacts 26 adapted to be closed when said winding is de-energized. A conductor 27 attached to the moving element 14 of the instrument 13 is connected to the contacts 25 of the relay 23, and thence, when said relay is energized, to a conductor 28 forming one side of an electrical energy source 29. The terminal 20 of the motor 11 is connected to a conductor 30 forming the other side of said source of electrical energy.

The conductor 22 is connected to the contacts 26 of the relay 23 and thereby, when said relay is de-energized, to conductor 28. From the disclosure as thus far set forth it will be seen that when the winding 24 of the relay 23 is energized and the contacts 25 closed, there is provided a pyrometric control system of the conventional type in which the regulating valve 11 will be operated by the control instrument 13, in a sense to maintain a pre-established temperature value at the thermocouple 12 within the furnace 9. It will further be seen that should the winding 24 of the relay 23 be de-energized, opening the contacts 25 and closing the contacts 26, the control instrument 13 will be cut out of circuit and the valve 11 closed without respect to the position assumed by the moving element 14 in the control instrument.

If the source of electric power 29 is alternating, energization of the winding 24 in the relay 23 may be provided by current drawn from said source. One end of said winding is connected to the conductor 28, and the other end by means of a conductor 31 through a capacitor 32 and a conductor 33 to one side of the circuit 15. The other side of the circuit 15 is connected through a conductor 34 to the conductor 30. A choke-coil 35 connected in series with the circuit 15 between the conductor 33 and the instrument 13, serves to reduce to a negligible amount the flow of alternating current through the measuring element of the instrument. Should the source of electric power 29 be direct current or of a frequency unsuited to the purposes of the invention, the winding 24, capacitor 32, and the circuit made up of conductors 33 and 34 and a portion of circuit 15 may be energized from any convenient A.-C. source, not shown in the drawings.

The operation of the protective elements of the device may be explained as follows: A circuit is provided for alternating current from conductor 28 through winding 24, conductor 31, capacitor 32, conductor 33, the loop of the circuit 15 including thermocouple 12, and conductor 34, to conductor 30, thus completing a path wherein alternating current may flow. As hereinabove pointed out, the choke-coil 35 prevents appreciable flow of alternating current in the measuring element of the control instrument 13, while at the same time the capacitor 32 effectually blocks any shunting action to the unidirectional electromotive force developed in the thermocouple 12, and confines the flow of thermoelectric currents to the measuring circuit. The choke-coil 35 offers substantially no barrier to the flow of direct current, and its resistance, if appreciable, can readily be compensated for in the adjustment of the instrument. Thus, under normal operating conditions the thermocouple 12 forms a part not only of the thermoelectric circuit, but also of a circuit carrying alternating current; and so long as this current flows in sufficient amount the winding 24 of the relay 23 will be energized, the contacts 25 closed, and normal control performance preserved. Should the thermocouple 12 or the portion of the circuit 15 associated with the couple become interrupted or develop an unduly high resistance, the element 14 of the instrument 13 will immediately be deflected to its lowest position; but at the same time the choke-coil 35 and the open (or abnormally high resistance) circuit in the thermocouple wiring present barriers to the flow of alternating current, so that the winding 24 of the relay 23 will be de-energized, the contacts 25 opened, and the contacts 26 closed. Under this condition, and without respect to the position assumed by the elements of the control instrument 13, the valve 11 will be operated in a sense to discontinue or reduce the supply of heating agent to the furnace 9, thereby avoiding dangerous overheating or other hazardous conditions.

In Fig. 2 is shown a form of the invention in which the alternating current upon which the protective device is dependent is obtained from an oscillating circuit including an electron tube, and in which an open circuit in the thermocouple wiring causes the oscillation of said circuit to cease, thereby permitting the flow of direct current from a battery source to energize a relay which actuates a warning signal for the purpose of indicating thermocouple failure. It is understood that the circuit shown in Fig. 2 (as well as in the succeeding Figs. 3 and 4) is applicable to a control system including an oven or space to be heated by the admission of heating agent through a pipe subject to an electrically operated valve such as are shown in combination in Fig. 1. A measuring instrument 40 is actuated from a thermocouple 44 exposed to the temperature under measurement through a two-conductor circuit 45 having in series therewith a choke-coil 46. A relay 47, having an actuating winding 48 is provided with contacts 49 adapted to be closed when said coil is energized and contacts 50 adapted to be closed when said coil is de-energized. The contact 49 is connected to signal device 42 and the contact 50 is connected to signal device 43, the opposite sides of said signal devices and said contacts being connected to opposite sides of a line 29' energized from any suitable current source. When relay 47 is in the energized position, signal device 42 will be actuated to indicate failure in the thermocouple circuit, and when relay 47 is in the de-energized position, signal device 43 will be actuated to indicate normal operation.

An electron tube 51, having a cathode 52 of the indirectly heated type, a control grid 55, and plate 56, is provided with an oscillation circuit. A battery 54 provides power to heat filament 53 and battery 63 provides power for the plate circuit. Oscillation is caused by regenerative feedback from the output to the input circuit through capacitor 57, and coils 58 and 59 tuned to a resonant frequency by capacitor 60 in a manner well-known in the art. Said feedback circuit is completed through a portion of the two-conductor circuit 45 and the thermocouple 44, in series with capacitor 57. A resistor 61 and capacitor 62 connected in parallel with each other between the oscillator coil 59 and the control grid 55 will, in a manner well-known in the art, cause a material decrease in the D.-C. component of the output current when an oscillatory condition develops in the system. Power for the filament 53 is derived from battery 54, and for the plate circuit from battery 63 having its negative terminal connected to the cathode 52 and its positive terminal to the plate 56 in series with the winding 48 of the relay 47. With a circuit connected as thus set forth, there will develop an oscillatory condition which will tend to maintain at a minimum the value of direct current drawn from the battery 63 and passing through the winding 48. The relay 47 is thus substantially de-energized and stands with its contacts 50 closed and its contacts 49 opened, providing a normal control circuit to the system under regulation. Upon interruption or failure of the thermocouple 44 or its associated winding, since the choke-coil 46 forms an effective barrier to the flow of high frequency current, the feedback circuit will no longer be continuous, and oscillation of the system will cease. Under this condition the direct current component of the current drawn from the battery 63 and flowing through the winding 48 will increase to a value where the relay 47 is actuated to close the contacts 49 and open the contacts 50, thereby indicating a fault by means of warning signal 42. This action takes place entirely independently of the measuring instrument 40.

In Fig. 3 is shown a form of the invention which possesses certain advantages over the form illustrated in Fig. 2 and also makes use of an oscillating circuit. A control instrument 65, similar to instrument 13 in Fig. 1 and having a "low" terminal 66, a "high" terminal 67, and a common terminal 68 is adapted to be connected through these terminals to the opening and closing terminals respectively of a valve in a manner similar to that shown in Fig. 1, and to operate said valve as in Fig. 1. The measuring element of the control instrument 65 is actuated from a thermocouple 69 exposed to the temperature under control, through a two-conductor circuit 70 having in series therewith a choke-coil 71. A relay 72 having an actuating winding 73 is provided with contacts 74, adapted to be closed when said winding is energized, and contacts 75 adapted to be closed when said winding is de-energized. The contact 74 is connected to terminal 68 of the control instrument and contact 75 is connected to terminal 67 of said instrument, this arrangement corresponding to that shown in Fig. 1. All other connections in the control circuit may be the same as those fully set forth in Fig. 1. Said control circuit may, of course, be energized from any suitable current source.

An electron tube 76 having an electron emitting cathode 77 heated by a filament 78 which is energized from a battery 79 is provided also with a control grid 80 and a plate 81. The elements of this tube form part of an oscillation circuit of the tuned plate-tuned grid type. An inductive coil 82 and a capacitor 83 provide tuning in the output or plate circuit. An inductive coil 84 and a capacitor 85 provide tuning in the input or grid circuit. The inter-electrode capacitance between the plate and grid of electron tube 76 provides the necessary regenerative feedback to cause oscillation when the input and output resonant circuits are tuned to the same frequency. A battery 86 is connected between the cathode 77 and the resonant output circuit through the winding 73 of the relay 72; and the cathode 77 is also connected by a conductor 87 to the input resonant circuit formed by the inductance 84 and the capacitor 85. A capacitor 88 connected between the cathode 77 and the plate circuit provides a low impedance path for high frequency current from the output circuit to the cathode. A resistor 89 and a capacitor 90 connected in parallel with each other between the oscillatory circuit and the control grid 80 will cause a material decrease in the D.-C. component of the output current when an oscillatory condition develops in the system. The thermocouple 69 including a portion of the two-conductor circuit 70 is connected through a capacitor 85' across the inductance coil 84, so as to cause de-tuning and prevent oscillation when the circuit through the thermocouple wiring is complete. Under this condition the input circuit will be tuned to a different frequency from that of the output circuit and oscillation will cease, causing an increase in the D.-C. component of output current derived from the plate 81 and flowing through the winding 73 of the relay 72. Thus, so long as the circuit through the thermocouple functions normally, the relay 72 will be energized, the contacts 74 closed, and a normal control circuit maintained. Should the thermocouple fail, however, its bridging effect across the oscillating circuit formed by inductance 84 and capacitor 85 will be removed, and since choke-coil 71 acts as a barrier to the flow of high frequency current, the resonant circuit will be free to oscillate to its tuned frequency, setting up an oscillatory condition in the electron tube circuit, and reducing the D.-C. component of current in the winding 73 to such a value that the relay 72 is released, the contact 74 opened, and the contact 75 closed, thus causing the control valve to be closed and the supply of heating agent discontinued without respect to the position of the control instrument. In practice, the tuning of the inductance 84 and capacitor 85 is made sufficiently broad that the capacitance of the thermocouple leads together with that of the capacitor 85' in series therewith will not be sufficient to stop oscillation.

It will be observed that the circuit shown in Fig. 3 operates in a reverse sense to that shown in Fig. 2 to the extent that, should any part of the electron tube circuit or the power supply fail, the relay 72 will at once revert to the safe position.

In Fig. 4 is shown a form of the invention having characteristics similar to that shown in Fig. 3, but adapted for operation from an A.-C. source of power supply. A control instrument 90, having a "low" terminal 91 and a "high" terminal 92 and a common terminal 93 is adapted to be connected through these terminals to the opening and closing terminals respectively of the valve in a manner similar to that shown in Fig. 1 and to operate said valve as in Fig. 1. The measuring circuit of the control instrument 90 is connected to a thermocouple 94 exposed to the temperature under control through a two-conductor circuit 95, having in series therewith a choke-coil 96. A relay 97, having an actuating winding 98, is provided with contacts 99 adapted to be closed when said coil is energized. The contact 99 is connected to the terminal 93 of the controller 90, and a contact 100 to the terminal 92 of said controller, this arrangement corresponding to that shown in Fig. 1. All other connections in the control circuit (energized from any suitable source of current) may be the same as those fully set forth in Fig. 1.

An electron tube 101, having an electron emitting cathode 102 heated by a filament 103, is provided also with a control grid 104, a plate 105, and a screen grid 106. The circuit associated with electron tube 101, like that shown in Fig. 3, operates as a tuned plate-tuned grid oscillator. The resonant frequency of the input circuit is established by an inductive coil 107 and a capacitor 108 in parallel. In series with the grid 104 are a resistance 109 and a capacitor 110 in parallel with each other, whereby the flow of average plate current will be limited when an oscillatory condition exists. The transformer 111, having a tapped secondary winding 112 and receiving power from an A.-C. source 113, supplies energy to the electron tube circuit. A low voltage portion 114 of the secondary 112 heats the filament 103. The entire secondary 112 supplies power to the plate circuit including the winding 98. A capacitor 117 may be connected across the winding 98 to serve as a by-pass for the A.-C. component of current flowing in the circuit. The screen grid 106 is connected to an adjustably positioned contact 118 on a slide-wire resistance 119 connected across the transformer secondary 112 between its high potential tap and the cathode 103, whereby the screen grid potential may be adjusted to any desired value to limit the flow of average current in the plate circuit. Resonance at the oscillation frequency in the output circuit is established by the leakage resistance of the transformer secondary 112 in parallel with its distributed capacitance. The resonant circuit made up of the inductance 107 and the capacitor 108 is tuned to the same frequency as that established in the output circuit. A capacitor 115 in series with a portion of the lead wires 95 and thermocouple 94, is connected across the secondary 112 of transformer 111.

The operation of the circuit as set forth is substantially equivalent to that shown in Fig. 3, there being a tendency for oscillation due to the common resonant frequency of the output and input circuits, and regenerative feedback due to interelectrode capacity between the plate and control grid within the electrode tube 101, and this tendency being inhibited by the de-tuning action of the thermocouple circuit and the capacitor 115 across the output resonant circuit. Under this condition there will be no oscillation, and the D.-C. component of current flowing in the winding 98 will be sufficient to energize the relay 97 maintaining the contact 99 closed and establishing a normal control condition. Upon failure of the thermocouple circuit, and since the choke-coil 96 provides an effective barrier to the passage of oscillatory current, the inhibition of oscillation is removed, and an oscillatory condition develops in the circuit, whereby the D.-C. component of current in the winding 98 will be materially reduced, the relay de-energized, the contacts 100 closed, and the control system rendered independent of the position of the contacts in the instrument 93 and caused to revert to a safe condition.

It is obvious that the electron tube oscillator circuit may conform with any of the common types well known in the art, and is not limited to the particular circuits shown. This type of circuit may be applied also to other devices in which it is required to detect the failure of one element, without departing from the spirit of invention.

The present application is a continuation-in-part of my application Serial No. 213,621, filed June 14, 1938.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In combination, an oscillation circuit including an electron discharge device, an element responsive to a variable condition, means controlled by said element to produce an effect on said condition means for inhibiting oscillation of said circuit while said element is in normal condition and for permitting oscillation upon failure of said element, and means responsive to oscillation in said circuit to superpose an influence on said effect.

2. In a control system, the combination of a thermocouple, an electrical instrument adapted to be actuated by unidirectional current derived from said couple and to produce a control effect, said instrument being connected to said couple by means of a pyrometer circuit including an inductive portion, a device for modifying said control effect, an oscillatory electric system for actuating said device, said system being so connected to said pyrometer circuit as to permit the flow of oscillatory current through said thermocouple while flow of said current is inhibited through said inductive portion, whereby upon open-circuiting of said couple the oscillatory condition in said system will be changed and said modifying device actuated.

3. In a system for controlling a variable temperature, the combination of a thermocouple responsive to said temperature, an electrical means adapted to be actuated by current derived from said thermocouple, means controlled by said electrical means for regulating said temperature, a pyrometer circuit connecting said thermocouple to said electrical means and having an inductive portion providing substantially greater impedance to alternating than to unidirectional current, an oscillatory electric system including an electron discharge device, connections between said oscillatory system and said pyrometer circuit for enabling the flow of oscillatory current through said thermocouple while flow of said current is inhibited through said inductive portion, said oscillatory system including means responsive to failure of said thermocouple for changing the oscillatory condition in said system, and means responsive to said changed oscillatory condition for assuming control over said temperature regulating means and excluding said electrical means from said control.

4. In a system for controlling a variable temperature, the combination of a thermocouple responsive to said temperature, an electrical means adapted to be actuated by current derived from said thermocouple, means controlled by said electrical means for regulating said temperature, a pyrometer circuit connecting said thermocouple to said electrical means and having an inductive portion providing substantially greater impedance to alternating than to unidirectional current, an oscillatory electric system including an electron discharge device having input and output circuits, connections between said system and said pyrometer circuit for enabling the flow of oscillatory current through the thermocouple while flow of said current is inhibited through said inductive portion, means in said oscillatory system for maintaining said input circuit out of tune with said output circuit as long as said oscillatory current flows through said thermocouple, and for establishing resonance between said input and output circuits upon failure of said thermocouple, and means connected to said output circuit and responsive to said establishing of resonance between said input and output circuits for assuming control over said temperature.

FRED B. MacLAREN, Jr.